(12) United States Patent
Henley

(10) Patent No.: US 8,637,382 B2
(45) Date of Patent: Jan. 28, 2014

(54) LAYER TRANSFER OF FILMS UTILIZING THERMAL FLUX REGIME FOR ENERGY CONTROLLED CLEAVING

(75) Inventor: Francois J. Henley, Aptos, CA (US)

(73) Assignee: Silicon Genesis Corporation, San Jose, CA (US)

( * ) Notice: Subject to any disclaimer, the term of this patent is extended or adjusted under 35 U.S.C. 154(b) by 360 days.

(21) Appl. No.: 13/195,259

(22) Filed: Aug. 1, 2011

(65) Prior Publication Data

US 2013/0032582 A1 Feb. 7, 2013

(51) Int. Cl.
*H01L 21/30* (2006.01)
*H01L 21/46* (2006.01)

(52) U.S. Cl.
USPC ............... 438/460; 250/492.2; 250/492.22; 250/492.3; 250/494.1; 250/492.1; 438/5; 438/33; 438/463

(58) Field of Classification Search
USPC ............... 219/121.12, 121.18, 121.35, 219/121.6–121.62, 121.68, 121.69, 121.85; 438/5, 57, 458, 459, 520, 526, 528; 250/492.1, 492.2, 492.22, 492, 3, 250/494.1
IPC ............................................. H01L 21/30,21/46
See application file for complete search history.

(56) References Cited

U.S. PATENT DOCUMENTS

| | | | | |
|---|---|---|---|---|
| 5,763,290 A | * | 6/1998 | Nakajima | 438/33 |
| 6,861,335 B2 | * | 3/2005 | Ueda | 438/458 |
| 8,293,619 B2 | * | 10/2012 | Henley | 438/458 |
| 8,324,084 B2 | * | 12/2012 | Koezuka | 438/474 |

* cited by examiner

*Primary Examiner* — Samuel M Heinrich
(74) *Attorney, Agent, or Firm* — Kilpatrick Townsend & Stockton LLP

(57) ABSTRACT

A method and system for cleaving a film of material utilizing thermal flux. The method includes providing a substrate having a face and an underlying cleave region including a prepared initiation region. Additionally, the method includes subjecting the initiation region to a first thermal flux to form a cleave front separating the cleave region of the substrate to a film portion and a bulk portion. The method further includes subjecting an area of the bulk portion substantially in the vicinity of the cleave front to a second thermal flux to cause a temperature difference above and below the cleave region for inducing a propagation of the cleave front expanding the film portion to the area at the expense of the bulk portion. Furthermore, the method includes determining a scan path for the second thermal flux based on the cleave front. Moreover, the method includes scanning the second thermal flux to follow the scan path to further propagate the cleave front.

30 Claims, 9 Drawing Sheets

LAYER TRANSFER OF FILMS UTILIZING THERMAL FLUX REGIME FOR ENERGY CONTROLLED CLEAVING

CROSS-REFERENCES TO RELATED APPLICATIONS

NOT APPLICABLE

BACKGROUND OF THE INVENTION

From the beginning of time, human beings have relied upon the "sun" to derive almost all useful forms of energy. Such energy comes from petroleum, radiant, wood, and various forms of thermal energy. As merely an example, human beings have relied heavily upon petroleum sources such as coal and gas for much of their needs. Unfortunately, such petroleum sources have become depleted and have lead to other problems. As a replacement, in part, solar energy has been proposed to reduce our reliance on petroleum sources. As merely an example, solar energy can be derived from "solar cells" commonly made of silicon.

The silicon solar cell generates electrical power when exposed to solar radiation from the sun. The radiation interacts with atoms of the silicon and forms electrons and holes that migrate to p-doped and n-doped regions in the silicon body and create voltage differentials and an electric current between the doped regions. Solar cells have been integrated with concentrating elements to improve efficiency. As an example, solar radiation accumulates and focuses using concentrating elements that direct such radiation to one or more portions of active photovoltaic materials. Although effective, these solar cells still have many limitations.

As merely an example, solar cells often rely upon starting materials such as silicon. Such silicon is often made using either polysilicon and/or single crystal silicon materials. Polysilicon material can also, depending on the size of single-crystal grains and degree of crystallinity, called multicrystalline, microcrystalline, or nanocrystalline. These materials will henceforth be called "polysilicon", as opposed to single crystal (monocrystalline) material which does not have numerous random crystal orientations and numerous grain boundaries. Amorphous silicon is not a form of silicon commonly used in wafered solar cells due to its poor carrier lifetime in thicknesses less than a few microns.

The materials for solar cells are often difficult to manufacture. Polysilicon cells are often formed by manufacturing polysilicon plates. Although these plates may be formed in a cost effective manner using crystallization furnaces, they do not possess optimum properties for highly effective solar cells. In particular, polysilicon plates do not exhibit the highest possible efficiency in capturing solar energy and converting the captured solar energy into usable electrical power.

By contrast, single crystal silicon (c-Si) has suitable properties for high grade solar cells. Such single crystal silicon is, however, expensive to manufacture and is also difficult to use for solar applications in an efficient and cost effective manner.

Additionally, both polysilicon and single-crystal silicon materials suffer from material losses during conventional manufacturing single crystal silicon substrates, where a sawing process is used to physically separate thin single crystal silicon layers from a single crystal silicon ingot originally grown. For example, inner diameter (ID) sawing process or wire sawing process eliminates as much as 40% and even up to 60% of the starting material from a cast or grown boule and singulate the material into a wafer form factor. This is a highly inefficient method of preparing thin polysilicon or single-crystal silicon plates for solar cell use.

To overcome drawbacks of using silicon materials, thin-film solar cells have been proposed. Thin film solar cells are often less expensive by using less silicon material or alternative materials but their amorphous or polycrystalline structure are less efficient than the more expensive bulk silicon cells made from single-crystal silicon substrates.

From the above, it is seen that techniques to manufacture suitable high quality single crystal silicon sheets with low cost and high productivity are highly desired.

BRIEF SUMMARY OF THE INVENTION

A film of material may be formed by providing a semiconductor substrate having a surface region and a cleave region located at a predetermined depth beneath the surface region. The cleave region refers to a stressed and substantially two-dimensional defect network plane region formed by irradiating a selected dose of hydrogen (H) ions. During a process of cleaving the film from the substrate, the cleave region is utilized to induce a lateral propagation of a film (just-cleaved portion) out of a tile (un-cleaved portion of the substrate) by controlling an external energy (pulse) in a vicinity of tile/film joint region. The tile/film joint region is a highly stressed crack which becomes a cleave front. According to certain embodiments, an in-plane shear component ($K_{II}$) is not zero while the external energy applied at the tile/film joint produces a pull/push lateral force to cause the propagation of the cleave front further into the tile. According to other embodiments, the $K_{II}$ component is purposefully maintained at a high level and serves to guide fracture propagation through the cleave sequence. In one embodiment, the external energy is a beam of thermal flux with its intensity or radiation amplitude under control by the controller. In another embodiment, the beam of thermal flux is scanned following a scan path substantially leading the cleave front under a feedback control using synchronized 2D temperature sensing. In yet another embodiment, the external energy is provided by an electromagnetic radiation energy source including a beam of laser light or E-beam radiation, which imparts a right amount of rapid thermal energy pulse at a precise spot in front of the cleave front to guide the cleaving of a film of material including silicon.

Embodiments of the present invention relate generally to layer transfer techniques for rapidly forming films of material. More particularly, the present invention provides a method and device for low or even implant free layer transfer of thick films for solar cells. Merely by example, it is applied to cleave films along a crystallographic plane of single crystal silicon substrate. But it will be recognized that the invention has a wider range of applicability.

Many benefits can be obtained by implementing the present invention. In a preferred embodiment, single crystal silicon ingot substrate with a surface plane in a {100}, {111} or {110} crystallographic plane can be selected. Thus, the (H) ion implantation for creating cleave region can be substantially limited to a low dose implantation with relative higher dose (the initiation dose) only on a portion of peripheral region to form a cleave initiation region. This substantially simplifies the layer transfer process, reduces system energy cost and enhances high volume manufacturability.

In certain embodiments, the layer transfer process is divided into (i) an initiation process utilizing a cleave initiation region formed by higher implant dose in a relatively small area of the silicon ingot substrate to initiate a fracture or form a cleave front, and (ii) a propagation process that extends the cleave front through the remainder of the silicon ingot substrate to release the film. In one embodiment, the cleave initiation region can be created using patterned implantation by irradiating high energy ionic particles with controlled dosage generated using a linear accelerator. Since the propagation process must extend the initiation region through the majority of the surface area of the film to be released, this process should operate reliably with a small implant dose, and perhaps without any dose. This is called the propagation dose, and the total dose needed for the process would therefore be the weighted area average of the initiation and propagation dose. For example, if the initiation area is 1% of the total area and utilizes $6 \times 10^{16}$ cm$^{-2}$ hydrogen while the propagation area utilizes $1 \times 10^{16}$ cm$^{-2}$ hydrogen, the total effective dose is $0.01 * 6 \times 10^{16}$ cm$^{-2}$ + $0.99 * 1 \times 10^{16}$ cm$^{-2}$ or $1.05 \times 10^{16}$ cm$^{-2}$. Reducing or even eliminating the propagation dose will have a first order effect on the total dose requirement for this cleaving process.

In a specific embodiment, the present invention provides a method for cleaving a film of material utilizing thermal flux. The method includes providing a substrate having a face and an underlying cleave region including an initiation region. Additionally, the method includes subjecting the initiation region to a first thermal flux to form a cleave front separating the cleave region of the substrate to a film portion and a bulk portion. The method further includes subjecting an area of the bulk portion substantially in the vicinity of the cleave front to a second thermal flux to cause a temperature difference above and below the cleave region for inducing a propagation of the cleave front expanding the film portion to the area at the expense of the bulk portion. Furthermore, the method includes determining a scan path for the second thermal flux based on the cleave front. Moreover, the method includes scanning the second thermal flux to follow the scan path to further propagate the cleave front.

In another specific embodiment, the present invention provides a method for cleaving a film of material by utilizing thermal flux. The method includes identifying an initiation region of a cleave region formed at a thickness beneath a surface of a substrate. The method further includes irradiating a beam of thermal flux at the initiation region to form a cleave front separating a film portion having the thickness and a bulk portion of the substrate. Additionally, the method includes performing a two-dimensional temperature mapping of the surface to determine a pathway over the bulk portion substantially in the vicinity of the cleave front. The method further includes scanning the beam of thermal flux to follow the pathway to irradiate at the bulk portion substantially in the vicinity of the cleave front to induce a propagation of the cleave front. Furthermore, the method includes adjusting the beam of thermal flux along the pathway based on the propagation of the cleave front.

In an alternative embodiment, the present invention provides a system for cleaving a film of material from a bulk substrate. The system includes a stage member configured to fix a bulk substrate having a surface and a pre-formed cleave region including an initiation region. The system further includes an energy source comprising a head member and a modulator. The energy source is configured to provide a beam of thermal flux capable of scanning over the surface and at least inducing a film cracking with a cleave front formed within the initiation region and a propagation of the cleave front along the cleave region. Additionally, the system includes a sensor device configured to measure temperatures throughout the surface. Additionally, the system includes a controller coupled to the sensor device and the modulator to adjust the beam of thermal flux. Moreover, the system includes a host computer comprising a processor in communication with the energy source and the controller, to cause the controller to generate one or more feedback control signals based on a two-dimensional profile of temperature measured by the sensor device referenced to a preset temperature value; to cause, using the one or more feedback control signals, the modulator to adjust intensity of the beam of thermal flux to maintain a temperature of the cleave front irradiated by the beam of thermal flux at a predetermined value to control the propagation of the cleave front; and to cause, using the one or more feedback control signals, the head member to scan the beam of thermal flux over the surface to synchronize the propagation of the cleave front.

In another alternative embodiment, the present invention provides a method for cleaving a film of material via energy control. The method includes providing a substrate having a face and an underlying crack initiation region. Additionally, the method includes coupling a thermally conductive overlayer on the face. The method further includes subjecting the thermally conductive overlayer to a first thermal flux projecting over the crack initiation region to induce a cracking at the crack initiation region and cause a formation of a cleave front between a cleaved film portion and an uncracked bulk portion. Furthermore, the method includes monitoring a temperature profile of the thermally conductive overlayer to determine a location of the cleave front. Moreover, the method includes subjecting an area of the thermally conductive overlayer projecting the vicinity of the cleave front to a second thermal flux to induce a propagation of the cleave front. The second thermal flux causes an expansion of the film portion to the area at the expense of the bulk portion.

Utilizing embodiments of the present invention, a high quality film of crystalline material having a thickness ranging from a few tens of microns to a few hundreds of microns, can be produced with kerf loss substantially lower than possible utilizing conventional techniques. The resulting single crystal silicon thick films are particularly suited for use in high efficiency (20% or higher) photovoltaic cells. Embodiments of the present invention further provide a method for utilizing a controlled thermal flux for cleave initiation and guiding cleave front propagation in a rapid and precise manner. The method utilizes a surface temperature mapping to provide one or more feedback signal for scanning the beam spot and adjusting beam intensity of thermal flux to achieve the controlled propagation. Furthermore, the method allows automatic detection of cleave failure, undesired cracking, or film breakage etc. Some embodiments can utilize existing manufacture processing systems and techniques, and take some advantage of certain newly developed techniques for manufacturing thin wafer/substrate for various semiconductor device applications. For example, embodiments of the present invention support H-plane cleaving with low propagation dose, is essentially non-contact, operates using low thermal-budget, is production throughput compatible, has low maintenance requirements and is scalable to most film thickness required by both semiconductor and solar industries. More details about various embodiments of the present invention can be found in the description below.

DETAILED DESCRIPTION OF THE INVENTION

Figure 1:
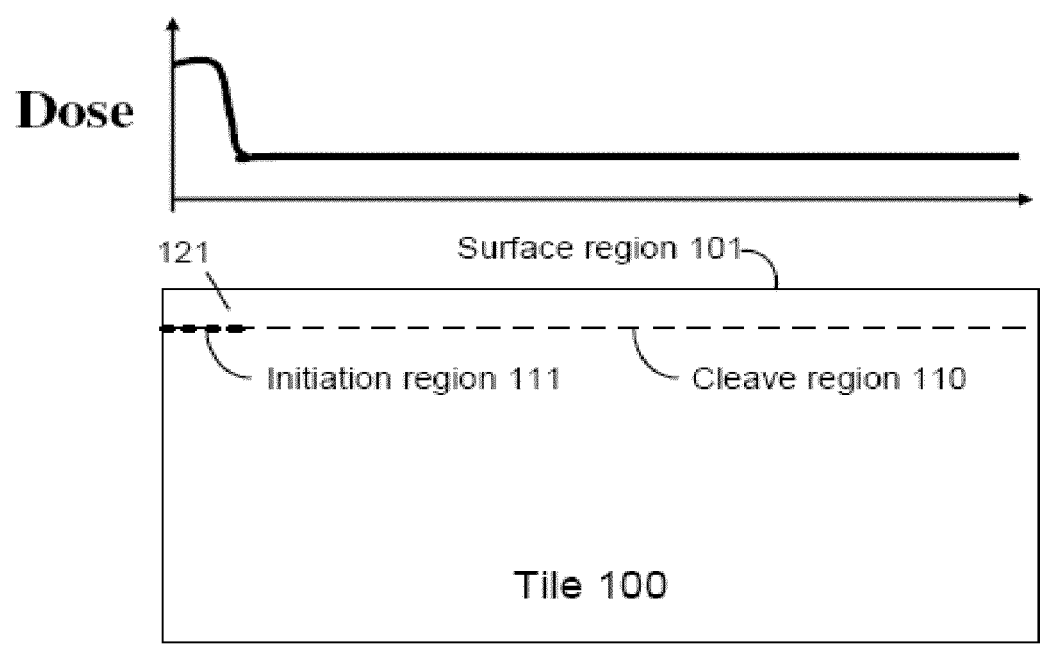
FIG. 1 shows a simplified schematic view of a dose profile by patterned H implantation for forming a cleave region with an initiation region in a tile substrate.

Particular embodiments of the present invention provide a method and device for layer transfer of films from a tile substrate. Merely by example, it is applied to cleave films along a crystallographic plane of single crystal silicon substrate. But it will be recognized that the invention has a wider range of applicability in both semiconductor and solar industries. For example, other materials such as Germanium, Gallium Arsenide (GaAs), Gallium Nitride (GaN), or Silicon Carbide (SiC) could be subjected to the cleaving process to release films of materials for solar, opto-electronic or semiconductor applications.

As discussed in background section, the growth of silicon based solar cells relies on driving down a bottleneck for cost in wafering kerf-loss. Traditional sawing, or adopting recently reported wafering technologies (such as multi-wire saw, spark cutting, laser cutting, or plasma cutting) that render thick films suitable for solar cells, may exhibit limited usefulness due to one or more of the following issues: high kerf loss, slow cutting speed, and lack of manufacturability.

A solution is to use a high energy ion beam to create a cleave region at a desired thickness beneath the substrate surface, then perform a layer transfer process to free the thickness of film from remaining substrate. However, use of only implanted ions to create a cleave region susceptible for cleaving, may require a high ion dose and an extended implanting area. Moreover, such reliance upon implanted ions may result in higher surface roughness, added cost with high ion dose and less productivity, and potentially lower yields. Depending upon the embodiment, these and other limitations are overcome using the present method and structures.

According to particular embodiments of the present invention, cleaving of a film of material may be accomplished with substantially reduced implantation of ions, or possibly no implantation at all, utilizing an energy-controlled cleaving process that carefully controls the shear conditions using external energy or simply a beam of thermal flux during the cleaving. In an embodiment, the ion implantation can be done with a so-called patterned implantation such that only a small fraction of substrate surface is irradiated by (relatively) high dose while rest major area being provided a low dose. For example, the patterned region of the substrate surface is exposed to a high energy H+ ion beam with energy level of 1 MeV or more using a linear accelerator. In one embodiment, the fraction of the patterned initiation region is limited to 1-3% of the total substrate surface area (e.g., 2-5 $cm^2$ or less for a 125 mm×125 mm sized substrate), so that the ion particle dose is well controlled minimize energy costs of the system and enhance productivity of the thick film cleaving process.

Then after the implantation process, a semiconductor substrate forms a cleave region at a predetermined depth beneath a surface region, which is an end-of-range (EOR) hydrogen implant layer with a corresponding stress profile. The stress profile is caused by bond damage and by stress induced by the presence of the hydrogen itself. Both of these considerations can lower the energy needed to create a new surface during cleaving action. The cleave region under the specific small fraction with high dose, usually located at a peripheral region of the substrate, correspondingly forms a special portion of the cleave region, which is called an "initiation region" in this specification. For purposes of the instant patent application, the term "cleave region" does not necessarily denote a region that has received radiation or implanted ions, but rather refers to a region that may be separated from the substrate following the application of radiation and/or implanted ions. In general, the initiation region, other than forming by a high ion dose in an implantation process, may be formed by subjecting the region to a thermal, chemical, electrical, and/or mechanical process. The combined energetic treatment and its corresponding thermal history applied to the region establishes a thermal budget for the corresponding region. The initiation region may have a different internal stress level compared to the propagation area that can be utilized for initiating a release of a section of the film therein.

FIG. 1 shows a simplified schematic view of a dose profile by patterned implantation for forming a cleave region with an initiation region in a tile substrate. An initiation region may be defined within a portion of the peripheral region and a vicinity of the cleave region. As shown, a tile 100 is subjected to a patterned H ion implantation to form a cleave region 110 at a pre-determined thickness under most of the tile surface. Within the cleave region and in the vicinity of the left edge, an initiation region 111 is formed due to the presence of a higher H ion implantation dose. On a macroscopic scale, the cleave region 110 is substantially a 2D plane substantially parallel to a surface region 101 of the tile 100. A region 121 between the surface region 101 and the cleave region 121 is defined as a film to be cleaved from the tile 100.

In a specific embodiment, the silicon substrate has a surface plane that is selectively in a {100}, {111} or {110} crystallographic plane (a certain small miscut angle of less than about 1° may exist due to pulling and cutting manufacturing tolerance buildup, however a deliberate miscut bias of 2-5 degrees can be beneficial for controlling planar and axial implant channeling effects). In a specific embodiment, the cleave region defined is substantially parallel to the surface region. Since the cleaving action is energetically easier along the {111} plane followed by {110} plane than in the traditional {100} plane, it is desirable to orient the material to be cleaved to coincide the surface to be cleaved with a lower surface energy crystallographic cleave plane, although {100} cleaving can also work.

In certain embodiments, the layer transfer process is divided into (i) an initiation process utilizing the initiation region formed by higher H ion implant dose in a relatively small area of the tile substrate to initiate a fracture or form a cleave front, and (ii) a propagation process that extends the cleave front through the remainder of the tile substrate to release the film. When the cleaving action proceeds reliably along the H-induced cleave region or within a plane at a desired thickness to release a film, the process will be generally referred to as controlled propagation. In particular, certain embodiments of the present invention seek to modify the cleaving configuration to achieve the controlled propagation by controlling an external energy within a threshold level required to propagate the cleave front so that below the cleave region propagation is favored by a high shear stress factor $K_{II}$ but energetically cannot be supported. In a specific embodiment, a beam of thermal flux is used to supply the required external energy and a low-dose H-implant layer serves to drive and guide a propagating cleave front. The beam of thermal flux contributes to the shear stress factor $K_{II}$ in two terms, one to activate the stress field in the cleave region due to an absolute temperature value and one to generate a force loading due to a temperature difference across the cleave region. Although a single thermal treatment may work, a two-step thermal process may give better results to induce dominant $K_{II}$ shear cleaving using, for example, a thermal soak thermal treatment followed by a dynamic heat pulsing treatment. More detail descriptions of techniques for direct layer transfer using energy controlled propagation, including application that utilizes thermal flux regime and takes advantage of H-cleave plane, can be found in U.S. Patent Application No. 61/092,683, entitled "LAYER TRANSFER OF FILMS UTILIZING CONTROLLED PROPAGATION," filed Aug. 28, 2008 by Francois J. Henley, commonly assigned, and hereby incorporated by reference herein.

Figure 2A:
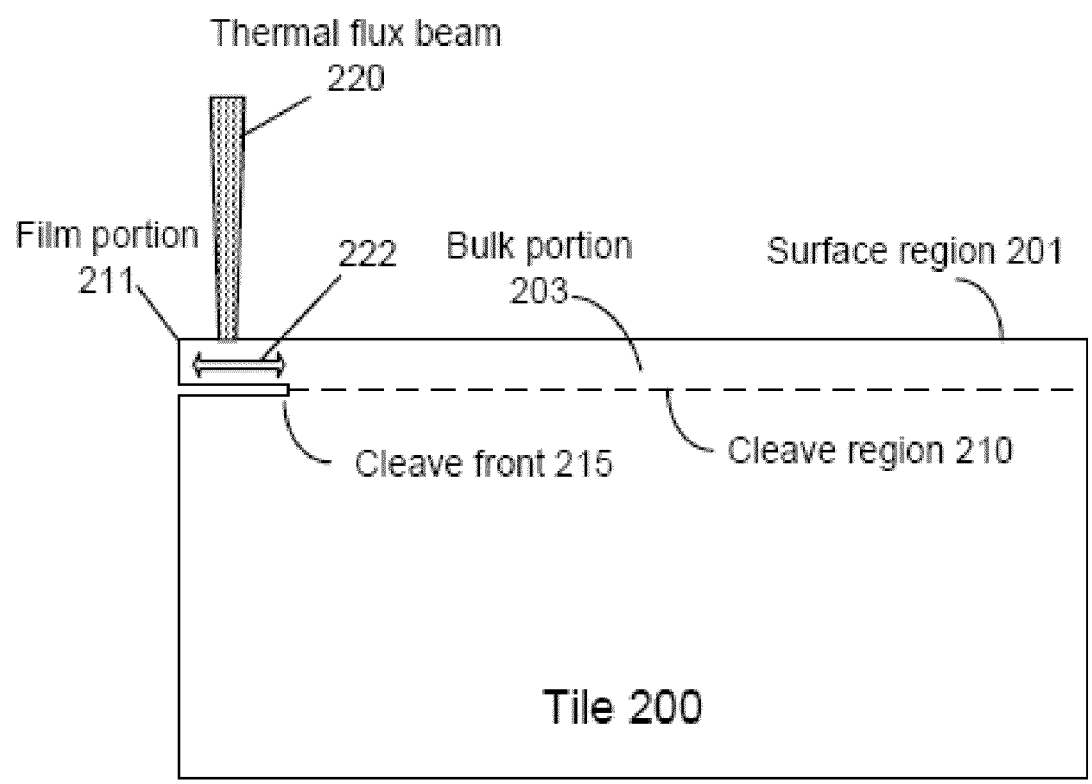
FIG. 2A is a simplified diagram showing a general method for using a thermal flux to initiate a cleaving for forming a cleave front according to an embodiment of the present invention.

In an embodiment of the present invention, the thermal flux as an external energy applied to the initiation region can be utilized to initiate the cleaving and create a cleave front. FIG. 2A is a simplified diagram showing a general method for using a thermal flux to initiate and form a cleave front according to an embodiment of the present invention. This diagram is merely an example, which should not unduly limit the scope of the claims herein. One of ordinary skill in the art would recognize many variations, alternatives, and modifications. In one embodiment, initiation cleaving is accomplished by subjecting the initiation region of the tile 200 to a localized thermal treatment, so that a cleave front 215 can initiate and form within this region, propagating the cleave along the cleave region depth 111 (of FIG. 1) to the periphery of the initiation region. Behind the cleave front, a film portion 211 is created. Beyond the cleave front 215 the lower H dose and the diminishing thermal profile does not promote further propagation along the cleave region 210 under the bulk portion 203.

In a specific embodiment, the localized thermal treatment is accomplished by using a beam delivering a thermal flux 220 with controlled intensity and irradiation time period. The beam of thermal flux corresponds to a heating pulse for generating shear stresses sufficient to initiate and propagate a localized cleave action within the initiation region 111 of FIG. 1. In this example, the specific thermal treatment is also depended on the thermal history of the corresponding region under the ion implantation and any post-implantation thermal treatments. Additionally, if the wavelength (if a photon beam such as a laser) and irradiation time (pulse length) of the thermal beam of thermal flux are selected properly, the thermally generated strain energy delivered by the beam can be controlled to be concentrated within the thickness of the film 101 above the cleave region 210. The thermal flux heats the material to create a local heating of a region 222 within the film 101 (between the cleave region 210 and the surface region 201) and a temperature difference across the cleave region 210. Thermal expansion of this region 222 occurs laterally due to this local spatial temperature variation, causing this portion of material to crack along the cleave region 210 to accomplish the initiation cleaving and form cleave front 215. The general film release process can then continue from this point to propagate the cleave front and expand the initiated film portion to the un-cleaved bulk portion through the remainder of the tile substrate. Of course, there are other variations, modifications, and alternatives depending on applications. More detail descriptions of the controlled cleaving utilizing thermal flux are given throughout the specification and particularly below.

Figure 2B:
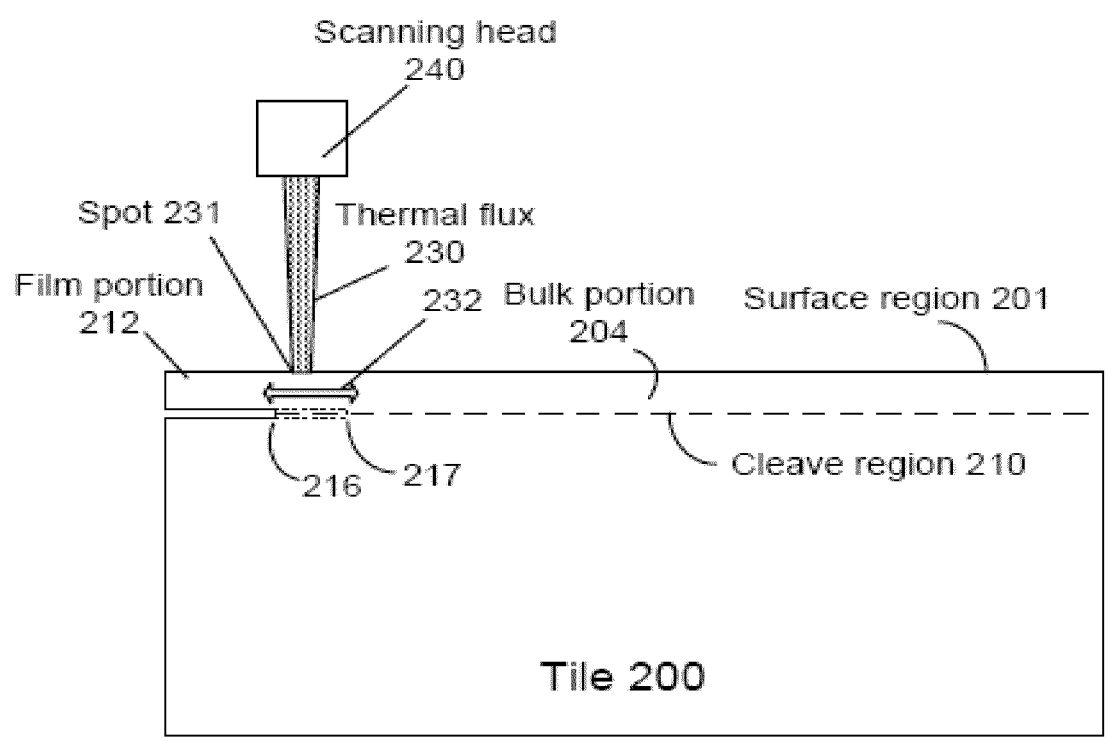
FIG. 2B is a simplified diagram showing a general method for using a thermal flux to induce a propagation of the cleave front to for direct transferring a film of material from a tile substrate according to an embodiment of the present invention.

FIG. 2B is a simplified diagram showing a general method for using a thermal flux to induce a propagation of the cleave front to for direct transferring a film of material from a tile substrate according to an embodiment of the present invention. This diagram is merely an example, which should not unduly limit the scope of the claims herein. One of ordinary skill in the art would recognize many variations, alternatives, and modifications. As shown, a tile 200 has a pre-existing initiation cleave region with cleave front 216 formed as a boundary to separate a film portion 212 and a bulk portion 204 above the cleave region 210. In an embodiment, a scanning head 240 has an integrated temperature sensing/imaging device that is capable of scanning across surface region 201 of the tile 200 to measure surface temperature. The scanning head 240 is also configured to scan and re-adjust the beam of thermal flux 230 to irradiate at a newly selected spot 231 based on surface temperature information. In a specific embodiment, the spot 231 is selected to be on part of the bulk portion 204 in front of the cleave front 216 and is substantially in the vicinity of the cleave front 216. Additionally, scanning (or re-positioning) the beam of thermal flux 230 is synchronized (and depended on) with a signal originated from the surface temperature measurement. Further, the scanning process of the beam of thermal flux 230 can also be synchronized with an intensity adjustment of the beam of thermal flux 230 during and following the scanning process.

In another specific embodiment, the beam of thermal flux 230 on the spot 231 is configured to have a pre-selected beam intensity and pulse length (or irradiation time period). The beam intensity and pulse length are selected to deliver desired amount of thermal energy to the region around the spot 231. In particular, the thermal energy at least expands laterally, indicated by a region 232 larger than the beam spot 231, the region 232 being a part of the bulk portion between the cleave region 210 and surface region 201. This dynamically induces a temperature difference across the cleave region, contributing substantial stress intensities ($K_I$ and $K_{II}$) to cleave front crack tip 216. In an embodiment, the selection of the beam intensity and pulse length depends on the thermal history of the region around the spot 231. Of course, fundamental material thermodynamic property and the thickness of the film to be cleaved are also factors to be considered. In an embodiment, the desired stress intensities are generated by the beam of thermal flux 230 and applied to the cleave front 216 where the stress level is at a local maximum due to the stress concentrations around the crack tip. When the necessary cleave energies are exceeded in a threshold fashion, a propagation of cleave front 216 can be induced in a controlled fashion. As the result, cleave front 216 will move forward to a new location 217, as guided by the synchronized scanning beam of thermal flux. At the same time, the film portion 212 expands at the expense of the bulk portion 204. Of course, there are other variations, modifications, and alternatives. More detail description about the thermal flux adjustment and automatic control under a specific apparatus made according to embodiments of the present invention will be found below.

Figure 3:
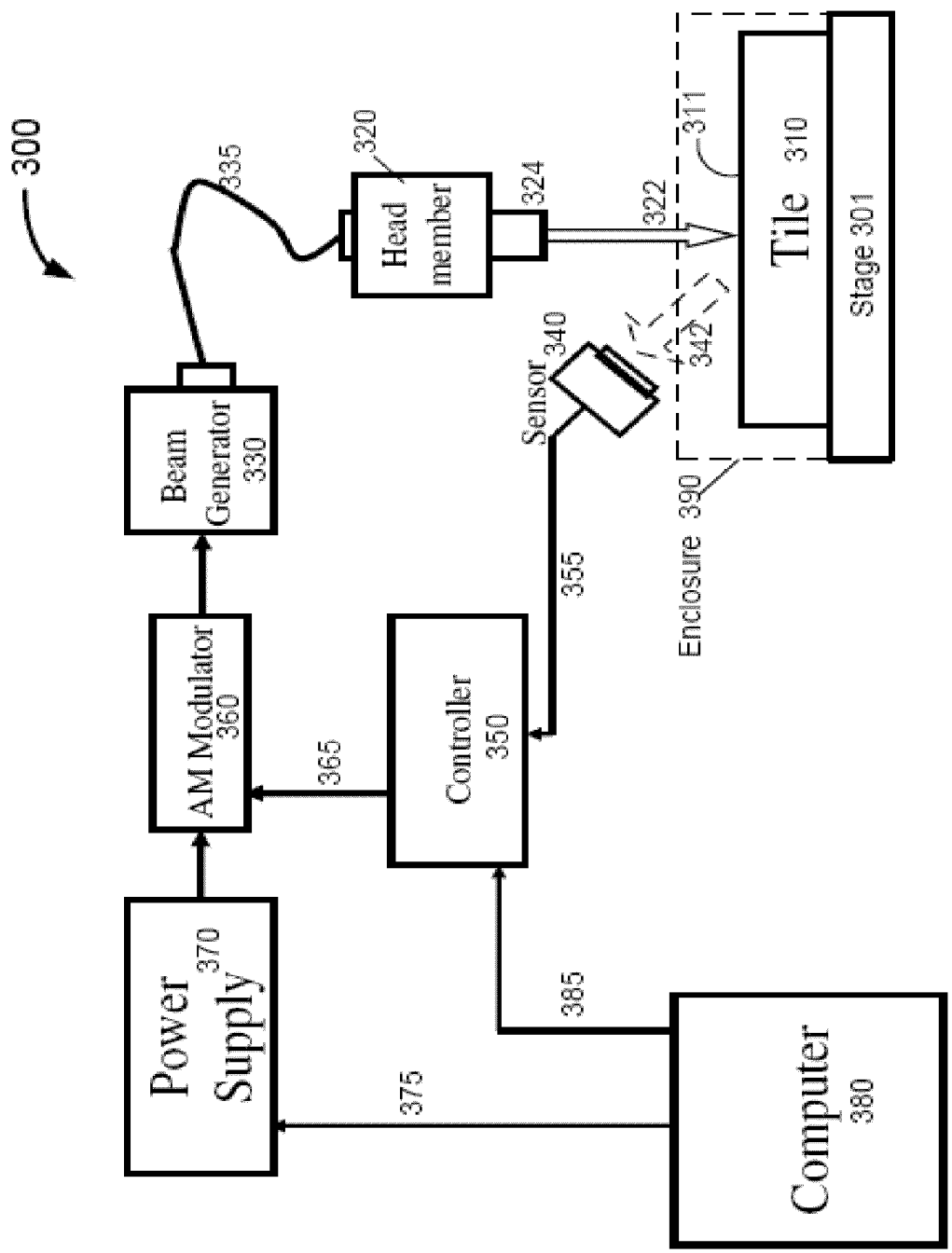
FIG. 3 is a simplified diagram illustrating a system for cleaving a film of material utilizing thermal flux regime according to an embodiment of the present invention.

FIG. 3 is a simplified diagram illustrating a system for cleaving a film of material utilizing thermal flux regime according to an embodiment of the present invention. This diagram is merely an example, which should not unduly limit the scope of the claims herein. One of ordinary skill in the art would recognize many variations, alternatives, and modifications. As shown, the system 300 for performing controlled transfer of a film of material includes an optional stage member 301 configured to fixedly support a tile substrate 310, a head member 320 with an optional scanning element 324 for projecting an energy beam 322 to a desired spot and scanning across a surface region 311 of the tile substrate 310. The system 300 further includes a beam generator 330 for producing the energy beam 322 which is transmitted to the head member 320 via a connection 335. The beam generator 330 is coupled to an AM Modulator (amplitude or beam intensity modulator) 360 to obtain a required power and pulse length for the energy beam 322. Additionally, the system 300 includes a sensor device 340 for collecting information of surface temperature of the tile substrate 310 being irradiated at least by the energy beam 322. In an embodiment, the sensor device is configured to measure the surface region 311 of the tile substrate 310 coincident with the incident beam area of thermal flux 322, thereby measuring the temperature of the irradiated surface during beam scanning operations. In a specific embodiment, the sensor device 340 is an optical pyrometer. The sensor device 340 is also configured to couple to a controller 350 via a connection 355 for sending sensor signals to the controller. The controller 350 is managed by a computer 380 (via connection 385) to utilize the sensor signals to generate one or more control signals. The controller 350 sends the one or more control signals to the AM Modulator 360, based on which one or more adjustments to the beam of thermal flux 322 are made. The computer 380 is also used to manage a power supply 370 for an operation of the AM Modulator 360. In an embodiment, the tile 310 and its supporting stage 301 can be put in an enclosure 390 capable of forming a vacuum environment for providing assistance during a controlled cleaving action.

Referring to FIG. 3, the system 300 can be one of subsystems integrated with a cluster system or a track system (not shown) for performing a complete layer transfer process to produce a plurality of films of material from the tile substrate 310. In particular, the system 300 is for performing a controlled cleaving process utilizing thermal flux regime. In a specific embodiment, the tile substrate 310 is a bulk-like work piece with a surface region and its vicinity in a certain range being subjected one or more pre-treatments in other subsystems of the cluster system or track system. For example, the one or more treatments include at least one or more ion implanting processes or one or more thermal, optical, electrical, chemical and mechanical treatments. As a result of the one or more pre-treatments, the tile substrate 310 includes a cleave region located at a certain depth beneath the surface region 311. The cleave region is a substantially 2-dimensional defect network with a highly stressed field, providing a guiding plane that will be utilized in the following cleaving process. In a specific embodiment, depending on the conditions varied during the one or more pre-treatments, the cleave region also includes an initiation region where an initiation cleaving action can be performed. The initiation cleaving results in formation of a cleave front that consists of a pre-cracked film within the initiation region, from which further film cleaving can be formed through propagation of this initiation region. The cleave front defines a boundary separating a (partially cleaved) film portion and a (un-cleaved) bulk portion. More details of the cleave front propagation in a controlled way utilizing the beam of thermal flux can be found throughout the specification and specifically in following sections.

In a specific embodiment, the cleaving action is a controlled process by the system 300 utilizing the beam of thermal flux 322 irradiated at the surface region 311 of the pre-treated tile substrate. In an example, the beam of thermal flux 322 can be a beam of laser light, a beam of electrons, or others carrying an adjustable amount of energy for controlled heating of material of the tile substrate 310 down to a predefined depth. In this application, a specific embodiment of the invention is illustrated by using a laser beam to provide the required thermal flux for performing controlled layer transferring including both a cleave initiation and subsequent cleave propagation. Of course, there can be other variations, modifications, and alternatives. One of ordinary skilled in the art should recognize that other types of energy beam can be used within the scope of this invention with certain state-of-art modifications.

In an implementation, a beam of laser light with wavelength around 980 nm is used. The laser light is generated by a laser diode (i.e., the beam generator 330) which is modulated by the AM Modulator 360 to yield a desired beam intensity ranging from zero (laser off) to 400 watts of optical power. The laser light is guided by a multimode fiber (i.e., the connection 335) to the head member 320 which projects the laser light as a beam 322 to deliver a thermal flux down to a spot on the surface region 311. In an example, the laser diode 330 is a Newport Corporation Cygnus 400 Watt CW laser diode module delivering the beam power via a 400 micron multimode fiber. The laser beam 322 outputted from the head member 320 is focused and aligned to project onto the surface region 311 with a spot diameter of about 3 mm. Depending on specific parameters such as (i) implant dose and depth, and (ii) thermal flux beam spot size and intensity, the area affected by the corresponding beam of thermal flux can range from about the beam diameter to a few times the beam diameter. For a spot size of 3 mm, the affected area was found to range from about 3 mm to 5-7 mm. The laser beam is characterized by a pulse duration ranging from microseconds to several seconds. In an embodiment, the pulse duration is controlled by the AM Modulator 360 to allow a selected spot on the surface region 311 being irradiated within a predetermined time period. In a specific embodiment, the selected spot on the surface region is a spatial region above the bulk portion substantially in the vicinity of the cleave front. The laser beam irradiates to the spot within the predetermined time period to induce or propagate a cracking or cleaving within the spot and is reduced in intensity or turned off depending on certain feedback control signals. The process is then repeated by moving or scanning the beam to a new location. The process can be a "step and repeat" as described or can be a continuous process where the beam is scanned at a selected velocity while undergoing continuous intensity adjustments based on sensor temperature feedback information.

Referring again to FIG. 3, the system 300 uses a sensing device 340 to closely monitor the cleaving action induced by the beam of thermal flux 322. As described in earlier paragraphs and illustrations of FIGS. 2A and 2B, the beam of thermal flux, e.g., a beam of laser pulse, delivers a desired amount of thermal energy to a selected spatial region for producing stress intensities that can causes the film to crack in a controlled manner. Here the sensing device 340 serves a monitor to detect the change of material structure around the cleave front from a part of bulk portion to a part of film portion.

In a specific embodiment, the sensing device 340 is a device for sensing or remotely measuring surface temperature. Because the power intensity of the laser pulse is relatively high, the thermal energy associated with the laser pulse can raise temperature rapidly within a very short time. For example, during initiation stage, a laser pulse of lower intensity can be applied to the designated initiation region for 1-2 seconds, causing a temperature rise exceeding about 500° C. In the controlled propagation stage, a higher intensity laser pulse can achieve similar temperatures after only 6-8 milliseconds of irradiation time (this parameter depends on the thickness of the film to be cleaved and the thermal history applied to the region in the vicinity of the spot). Once the crack front extends and propagates to release a new film portion in the vicinity of the laser spot, the region under the beam becomes part of the film portion with a thickness in an order of several tens or hundreds of microns. The sudden release of the film connection to the tile substantially lowers the ability of the film to transfer heat vertically, essentially lowering its effective thermal conductivity. This prevents, at least partially, the heat transfer downward, quickly raising the temperature of the just formed film portion. Therefore, the sensing device 340 can directly capture the sign of film cracking and propagation of cleave front through closely monitoring temperature changes occurring within the region.

In a specific embodiment, the sensing device 340 can be an optical pyrometer. In an example, an Infrared Pyrometer having a characteristic frequency response in a range of 10 KHz to 160 KHz with a sensing wavelength at about 1.6 µm and greater is used. The pyrometer is able to measure the surface temperature by detecting the emitted heat-induced infrared light 342 from the heated tile substrate. To avoid sensing device 340 interactions with the laser beam 322, a filter is used to block the laser wavelength (980 nm in this specific example) while allowing all wavelengths longer than about 1.2 µm to be used. The pyrometer not only is able to measure the surface (absolute) temperature (or at least sense the temperature change due to cleave front propagation) but when an integrated pyrometer enabled scanner is used (such as a DL.S20P galvo scanner with integrated pyrometer built by DILAS Diodenlaser GmbH of Mainz-Hechtsheim Germany), the pyrometer sensing element is continuously measuring the impinging laser spot area over the whole scanning area which can cover a complete tile (156 mm×156 mm area). The measurement is thus optically co-axial and synchronized with the scanning element of the head member to track the temperature under the scanning thermal flux beam. This facilitates laser beam control during cleave front propagation by allowing the data needed to determine laser beam scan paths and adjust beam intensity to optimize and control the cleaving progress. For example, the laser beam irradiates at one spot per 6-8 milliseconds before scanning to a next spot, so that the laser beam control is desired to have a rate of scanned adjustment in the kilohertz range, preferably more than 3-5 KHz. Industrial laser systems with pyrometer response of 100 microseconds coupled to a laser AM modulator with 3-10 KHz bandwidth allows for adequate film temperature control with sufficient response time to limit potentially damaging temperature excursions. If a faster laser control loop bandwidth is desired, 150 KHz pyrometers with 50-150 KHz laser AM modulators are also well within present technical capabilities.

In the case of silicon, an infrared pyrometer with a 1.2-2.2 µm sensing wavelength would be ideal to measure temperatures in the 90° C. to 1400° C. range with reasonable signal to noise ratio and high measurement bandwidths. However, since silicon is transparent above approximately 1-1.1 µm, measurement challenges exist to accurately measure the surface temperature of detached thin films ranging from a few tens to a few hundreds of microns. The effect is characterized by a low emissivity at the wavelengths of interest. Selecting a pyrometer that operate at a wavelength opaque to silicon such as 0.8 µm may work for an E-Beam system but is not considered an optimum solution for a laser source since practical laser light sources are close to this wavelength and will tend to saturate the pyrometer signal. The other issue is that a 0.8 µm pyrometer will have a compromised ability to measure temperature below 600° C. at high measurement bandwidth due to its substantially lower signal to noise ratio (S/N ratio) at these temperature ranges. It is possible to coat the silicon with a material such a graphite having good emissivity performance at 1.2-2.2 µm, but additional steps would have to be added which increases overall process cost. Fortuitously, this issue has been found to be practically resolved through laser induced free carrier generation within the film. The bright flux of light not only heats the material but also excites carriers within the thin-film that in turn raises the effective emissivity of the material. Temperature heating and measurement tests using a 1.2-2.2 µm pyrometer on 20 µm and 50 µm silicon films showed that although the pyrometer signal may differ from the expected temperature (especially in the lower temperature range of 100° C. to 300° C.), the pyrometer signal has reasonable S/N ratio at 10 KHz measurement bandwidth and is monotonic with temperature. With the above in mind, surface (or near-surface) temperature measurement and infrared heat emission will be used interchangeably and has the meaning of sensing a temperature proportional to the level of an infrared heat emission from the irradiated surface.

Additionally, the pyrometer is configured to convert any temperature measurement into one or more input signals for the controller 350. In an embodiment, the controller 350 drives the cleaving action using a closed-loop feedback mechanism. For example, a continuous closed-loop control at a pre-determined temperature set point can generate the required cleave energy to keep the front cleaving under the scanning laser beam. Once the cleave front propagates under the laser spot, the closed-loop system automatically re-adjusts the laser intensity downwards to compensate for the lower vertical thermal conductivity of the cleaved film. The laser intensity control signal can thus carry the information necessary to allow the control computer 380 to determine if cleave front propagation has occurred. In a different control regime where the laser intensity is set at a pre-determined point, the pyrometer 340 can sense when the surface temperature surpasses a predetermined threshold range (for example, 20-100 degrees above a known temperature capable of inducing film cracking), after which the controller 350 generates a control signal based on the above input signal. The control signal is sent to the AM Modulator 360 via connection 365. Based on the control signal, the AM Modulator 360 can generate a modulation signal for the laser diode 330 or even switch off the laser if necessary. At the same time, the control signal also includes an instruction for the head member 320 to provide a scan path, or at least a very first next spot of the scan path, of the laser beam. The control system can therefore be configured as a constant temperature feedback loop (with the error signal being the AM modulator control signal) or in a constant laser intensity mode where the sensed temperature can signal a process end point detection or be used to spatially map the thermal conductivity distribution to detect the cleave front location. The temperature difference across the cleave front (from film portion to bulk portion) can clearly indicate where the cleave front is laid out on the surface region. The next spot, in general, should be a spot on the bulk portion substantially adjacent to the just formed or propagated cleave front (or where the last spot irradiated by the laser beam generated a successful cleaving). Therefore, the scanning element 324 of the head member 320 follows the scan path provided by the controller to re-position the laser beam. Depending on the control mode (temperature or laser intensity set point control), the system can accomplish the cleave propagation action using pulsed or modulated laser intensity.

Referring to FIG. 3 again, the controller 350 is coupled to a computer 380 to load one or more controlling programs through a microprocessor. These controlling programs are managed by the computer. For example, the programs can be modified for different types of tile substrates and different thickness films to be cleaved. The control scheme includes a closed loop feedback control directly depending on actual temperature inputs or an open loop feedback control by presetting the laser intensity and pulse conditions. The computer 380 is also coupled to a power supply 370 to provide necessary voltage control (direct switching on/off) of the AM modulator 360.

Moreover, in a specific embodiment the system 300 can be applied for performing a controlled layer transfer process to produce a plurality of films from the bulk tile substrate. In a specific embodiment the tile substrate 310 is a crystalline silicon tile or ingot. Due to huge demand in traditional semiconductor industry and growing demand in solar cell industry too, high volume manufacture of the crystalline silicon films with various thicknesses with low kerf loss according to embodiments of the present invention provides substantial advantages in cost savings. Of course, other materials such as Germanium, Gallium Arsenide (GaAs), Gallium Nitride (GaN), or Silicon Carbide (SiC) could be alternative materials for applying the system to cleave technologically interesting material films of various thicknesses.

In an alternative embodiment, the illustration and descriptions of the FIGS. 2A, 2B, and 3 also show a method for cleaving a film of material utilizing thermal flux. In an implementation of the method, utilizing thermal flux is applying a laser beam to project onto and scan across a surface region of a tile substrate to deliver a controlled amount of energy within a predetermined time period. The tile substrate is a bulk substrate with a prepared surface under certain treatments which can include ion implantation, thermal, chemical and mechanical treatments. In an example, the tile substrate is a silicon ingot with a surface selected to be substantially along a {111} crystallographic plane. The method includes providing the tile substrate with a cleave region formed at a predetermined depth beneath the surface. The cleave region is a stressed plane caused by one or more treatment processes primarily surrounding a hydrogen (proton) ion implantation having an implant end-of-range energy selected to correspond to a vicinity of the desired cleave plane. In particular, the cleave region includes an initiation region formed by processes including at least an ion implantation at higher dose plus optional post implant thermal treatment.

Further, the method for cleaving a film of silicon material includes utilizing a first beam of thermal flux, specifically, a beam of laser light, to irradiate the initiation region which is located near an edge or corner of the tile substrate. The first beam of thermal flux, within a proper time period, causes an initiation of film cracking along the cleave region facilitated by the hydrogen implant end-of-range region. This event, the initiation cleaving, causes a detachment of a film of material above and below the cleave region, making the portion above a film portion and the portion below a part of remaining tile. The initiation cleaving also causes a formation of a boundary of the initiation region separating the cleaved film portion from the un-cleaved bulk portion beyond the initiation region. This boundary is called a cleave front. In an example, laser beam irradiation used for initiation cleaving is characterized by a 3 mm beam diameter, a wavelength about 980 nm, beam intensity of about 180-200 W for 1 to 2 sec, resulting in a temperature rise to about 600° C. within the initiation region. Of course, parameters such as the laser beam power and pulse length can be varied for different tile material and thickness of film to be cleaved. Those parameters also depend on a thermal history applied to the region in prior implant and thermal treatment processes. Once the cleave front is formed, further cleaving action may require less energy. A beam of thermal flux with adjusted power and controlled scanning can be used to induce a guided cleave front propagation.

In an embodiment, the method for cleaving the film of material further includes using a sensing device, for example, an IR pyrometer to measure surface temperature across the whole surface region of the tile substrate. A two-dimensional mapping of the surface temperature measurement using a constant laser intensity (or alternatively, measuring the laser intensity control signal under constant temperature set point closed-loop control) can be converted to a two-dimensional image identifying the location of the cleave front. Furthermore, the method includes subjecting a selected area of the bulk portion substantially in the vicinity of the cleave front to a second beam of thermal flux to cause a temperature difference above and below the cleave region. This temperature difference generates a lateral force to induce a propagation of the cleave front. In particular, the second beam of thermal flux is also a laser beam with a controlled power and irradiation period. In an example, a laser beam irradiation causing the cleave front propagation has a 3 mm beam diameter, a wavelength about 980 nm, beam power at about 60 W for 6 to 8 msec., resulting in a temperature difference of 200° C. or less within the selected area. Of course, these parameters are merely for one example. There can be many variations, modifications, and alternatives.

In an embodiment, the method for cleaving the film of material further includes identifying the propagated cleave front to determine a scan path for the second beam of thermal flux and scanning the second beam of thermal flux to follow the scan path to further expand the propagated cleave front. The identifying the propagated cleave front can be achieved by further utilizing the two-dimensional mapping of temperature measurement obtained by the pyrometer which also scans across the surface region including the cleave front line. The scanning of the pyrometer to sense the surface temperature can be synchronized with the scanning of the second beam of thermal flux. In an specific embodiment, the pyrometer detects a temperature rise of the area irradiated by the second beam of thermal flux over a pre-determined threshold range, which is an indicator that the area is turned to a film portion with the cleave front being pushed forward (to an effective boundary of the beam of thermal flux). Substantially immediately afterward, a sensing signal is sent to a controller which generates a control signal to AM modulator to adjust intensity modulation (by reduce voltage or even fully shut down the power) to change the power of laser beam. At the same time, the sensing signal also includes geometric information of the propagating cleave front and a projected scan path so that the corresponding control signal can carry instruction for a scanning element of the laser head to move the laser beam to irradiate at a next selected spot following the projected scan path. Subsequently, the laser beam can be adjusted by the controller to raise power to a desired level for the next selected spot to continue the guided cleave front propagation, leading to propagation to release additional film portions and eventually a full cleaving of film of material from the tile substrate.

Figure 4:
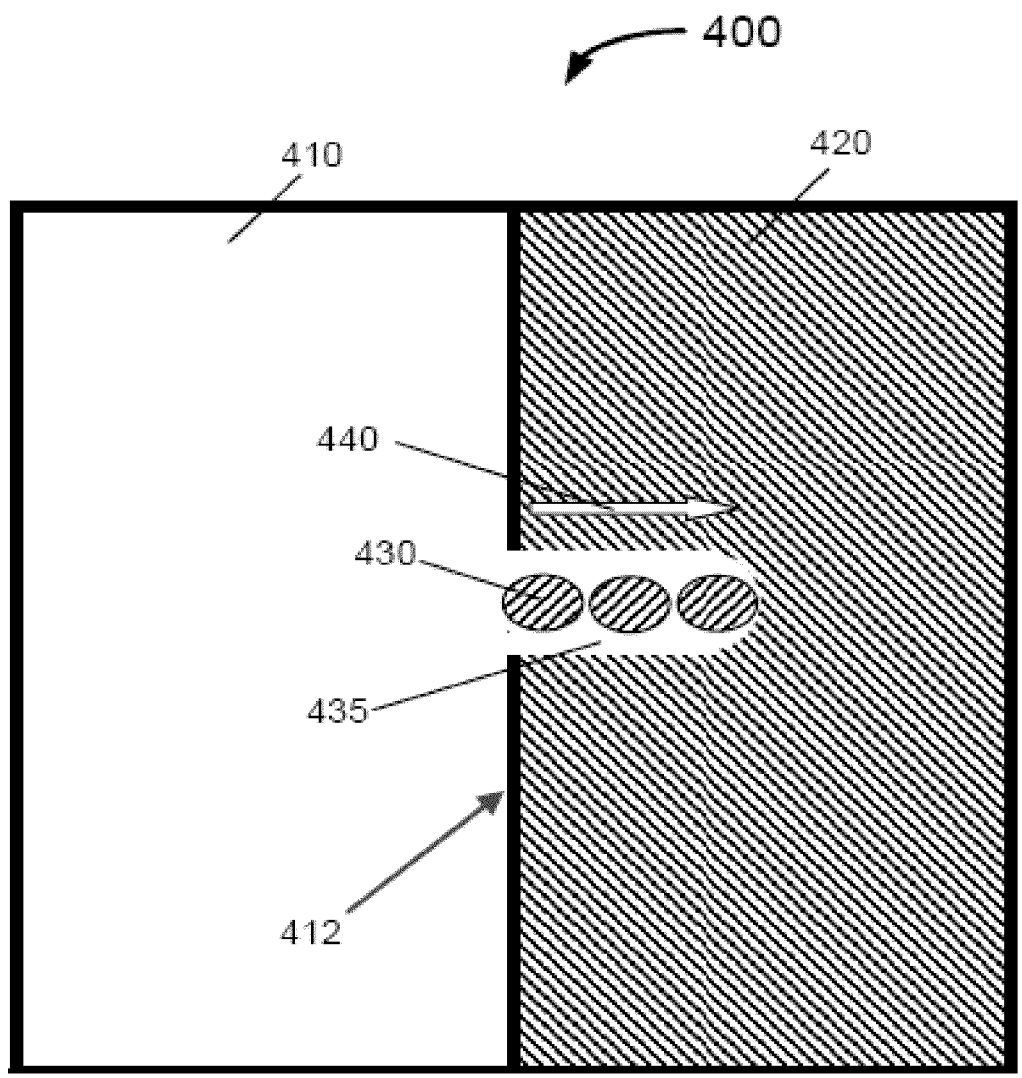
FIG. 4 is a simplified diagram illustrating a transverse scan of the beam of thermal flux to induce a propagation of the cleave front according to an embodiment of the present invention.

FIG. 4 is a simplified diagram illustrating a transverse scan of the beam of thermal flux to induce a propagation of the cleave front according to an embodiment of the present invention. This diagram is merely an example, which should not unduly limit the scope of the claims herein. One of ordinary skill in the art would recognize many variations, alternatives, and modifications. As shown, a partial cleaved tile substrate 400 has a cleaved film portion 410 and an un-cleaved bulk portion 420 separated by a cleave front 412. A beam of thermal flux 430 is applied to a region in bulk portion substantially in the vicinity of cleave front 412. As the result, the energy delivered by the beam of thermal flux causes cleaving action of the film under the beam. As shown, the cleaving occurs over an area 435 having a width larger than the diameter of the beam spot 430. For example, depending on application a beam diameter of 2-3 mm may cause an area of about 5 mm in diameter to be cleaved. Additionally, the beam of thermal flux 430 is guided to scan along a direction marked by the arrow 440 to move to a next spot. In particular, the example shows a direction substantially perpendicular to the existing cleave front 412. Correspondingly, the beam of thermal flux 430 continues to induce film cracking at the next spot and beyond. The beam of thermal flux 430 is further scanned along the direction 440 and causes the film portion 410 to expand inward to the region of bulk portion 420. The film portion 410 has now increased in area with the additional film 435 released from the bulk portion 420.

Figure 5:
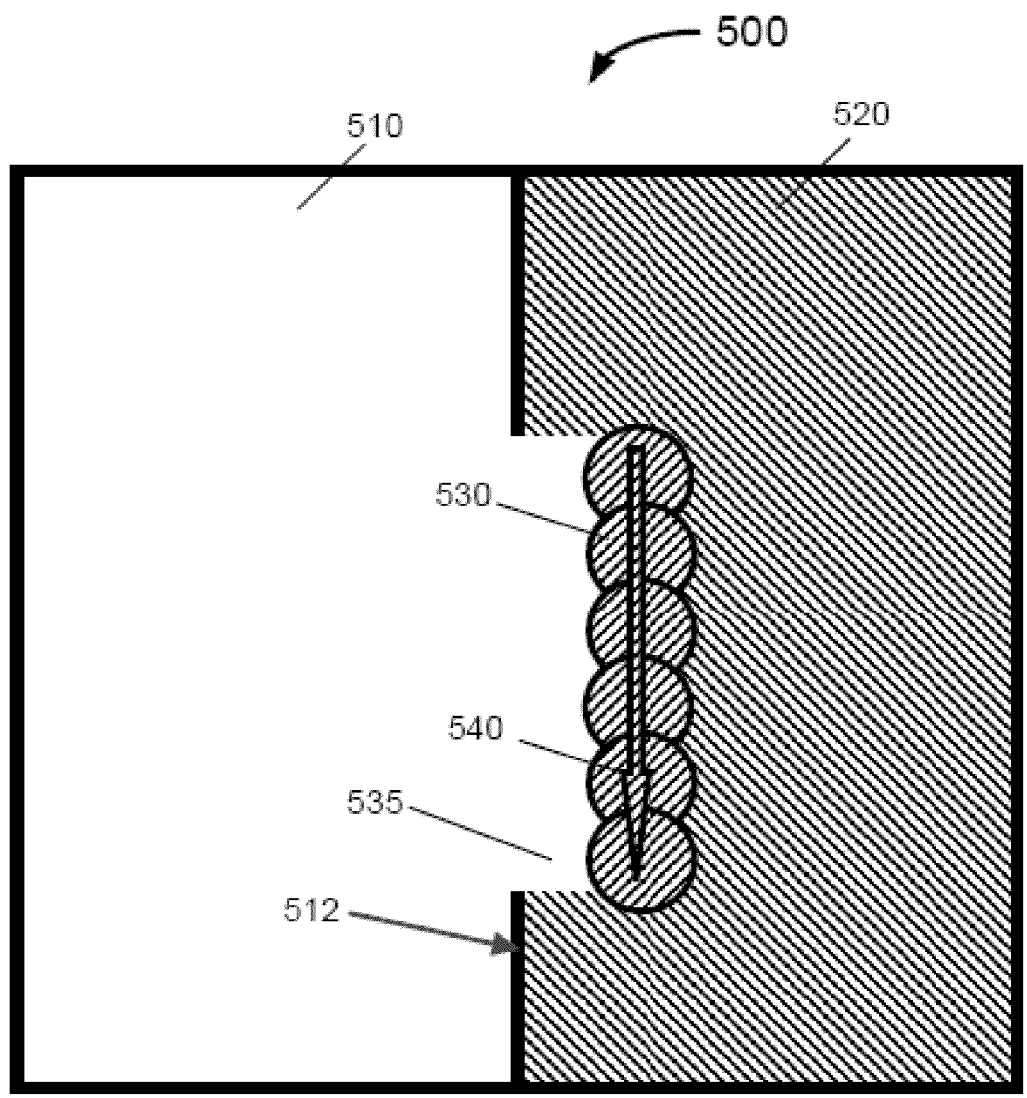
FIG. 5 is a simplified diagram illustrating a longitudinal scan of the beam of thermal flux to induce a propagation of the cleave front according to an embodiment of the present invention.

FIG. 5 is a simplified diagram illustrating a longitudinal scan of the beam of thermal flux to induce a propagation of the cleave front according to an embodiment of the present invention. This diagram is merely an example, which should not unduly limit the scope of the claims herein. One of ordinary skill in the art would recognize many variations, alternatives, and modifications. As shown in this alternative exemplary illustration, a partial cleaved tile substrate 500 has a cleaved film portion 510 and an un-cleaved bulk portion 520 separated by cleave front 512. A beam of thermal flux 530 is applied to a region in bulk portion 520 substantially in the vicinity of cleave front 512 and induces a cracking of the film in that region. Additionally, the beam of thermal flux 530 is guided to scan along a direction marked by the arrow 540 to move to a next spot. In particular, the example shows a direction substantially parallel to the existing cleave front 512. Correspondingly, the beam of thermal flux 530 continue to induce film cleaving at the next spot and beyond along the scan path and to move cleave front 512 accordingly. The film portion 510 has now increased in area with the additional film 535 released from the bulk portion 520.

Figure 6:
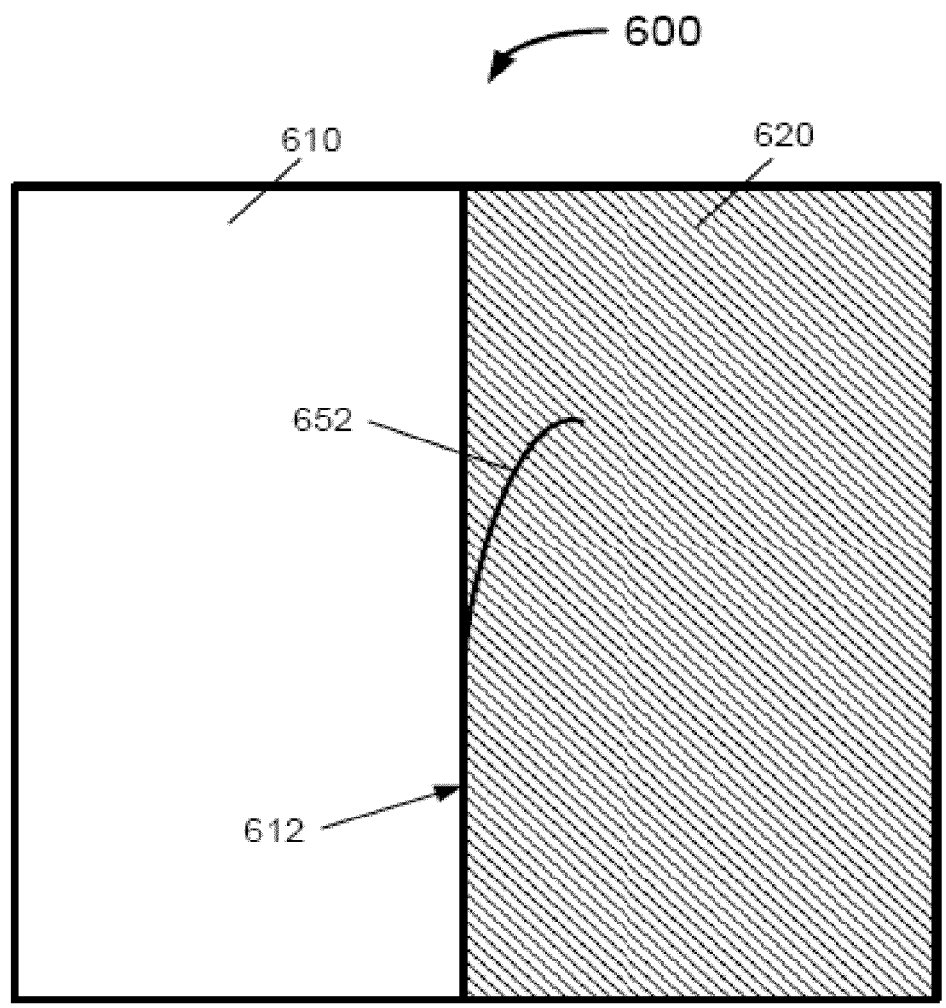
FIG. 6 is a simplified diagram of a surface with a partially cleaved film having a cleave failure with unwanted branching detected during the cleaving process using the apparatus according to an embodiment of the present invention.

In yet another alternative embodiment, the illustration and descriptions of the FIGS. 2A, 2B, and 3 also show a method for real time monitoring the cleaving of a film of material utilizing thermal flux. FIG. 6 is a simplified diagram of a surface with a partially cleaved film having a cleave failure with unwanted branching detected during the cleaving process using the apparatus according to an embodiment of the present invention. This diagram is merely an example, which should not unduly limit the scope of the claims herein. One of ordinary skill in the art would recognize many variations, alternatives, and modifications. As shown, a partially cleaved tile substrate 600 includes a cleaved film portion 610 and an un-cleaved bulk portion 620 separated by cleave front 612. This exemplary figure is a pseudo snap shot during the cleaving process utilizing a beam of thermal flux (not shown) integrated with a sensing device capable of mapping a 2D surface profile (a 2D line scan data). The integration of the sensing device and a control of the beam of thermal flux can be synchronized using a control feedback subsystem based on the mapped information of the 2D surface profile of either temperature (with a low but constant beam intensity) or laser intensity signal operated in a closed-loop constant temperature mode. In this example, a low temperature set point (one that does not damage the film or cause cleaving action) is used while the laser intensity needed to keep to the temperature set point is mapped as a function of X-Y location. Within an uncleaved portion, the laser intensity will be higher than a cleaved portion since the effective thermal conductivity will be higher within a region thermally connected to the underlying tile. As a result, mapping the laser intensity will give information whether the X-Y location being interrogated by the beam is over a cleaved or uncleaved portion (region 610 or 620). The lateral thermal conductivity will also have an influence on the closed-loop laser intensity signal, therefore film cracks such as defect 620 will limit the lateral heat transfer across the boundary. As a result, the film regions adjacent to the defect 620 will show a lower laser intensity needed to reach the temperature set point than other non-defective cleaved film regions. In particular, the 2D surface profile, which is continuously evolving as the cleaving action is going on, can be converted to a 2D image illustrating directly the location of the cleave front. If interlaced with the cleaving program, 2D cleave front imaging is a pseudo real time display of the tile undergoing the cleaving action. In this specific example shown in FIG. 6, a cleave failure may occur as an unwanted branching 652 is seen out of original cleave front 612. Of course, this just shows one type of cleave failure due to unwanted branching of the cleave front, which usually results in a fractured film. Avoidance of unwanted branching of the cleave plane is thus a consideration in the design of cleaving techniques. Some factors found to affect unwanted branching include crystal orientation and implant dose and depth and temperature profile. Embodiments of the present invention thus provide a way to monitor the controlled cleaving action in pseudo real time, which is very desirable when applying the method of controlled cleaving of a plurality of films in high-volume, automatic manufacturing.

Figure 7:
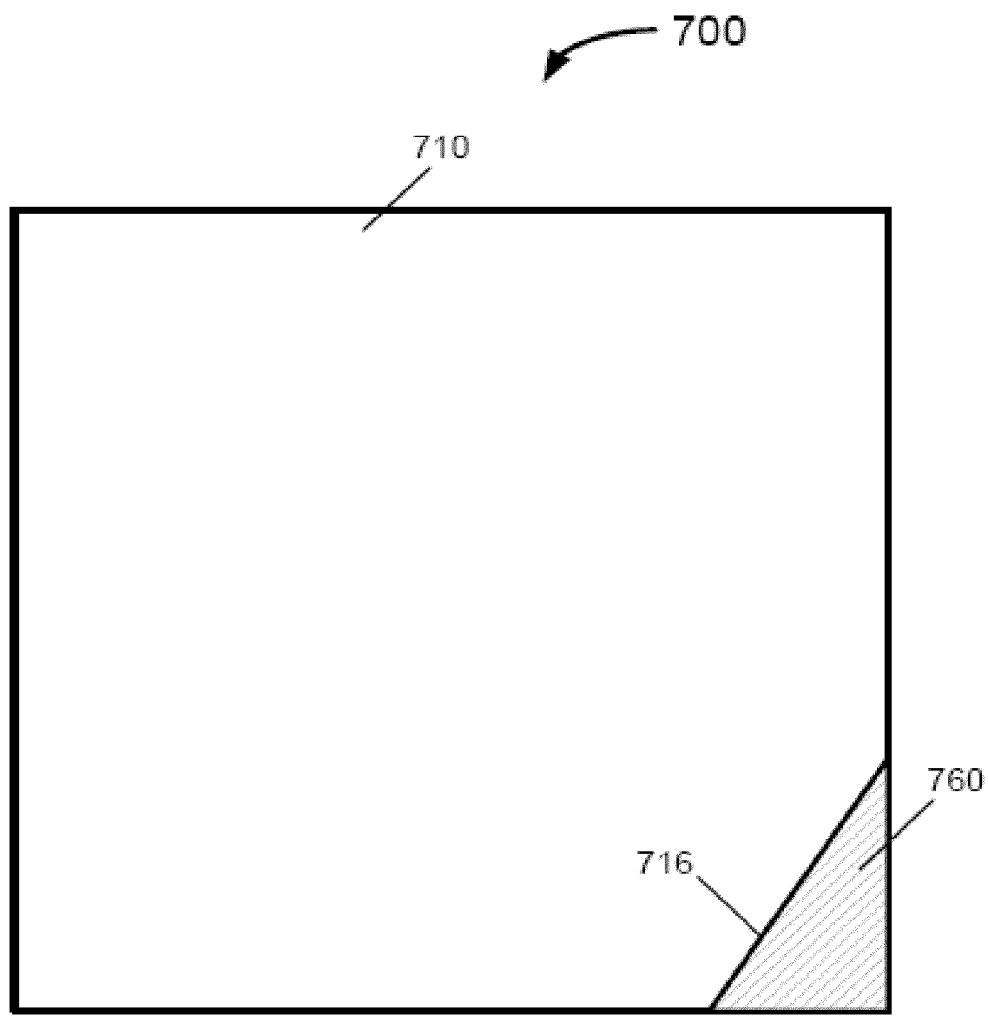
FIG. 7 is a simplified diagram of a surface with a fully cleaved film but having a film breakage found during post cleaving inspection using the apparatus according to an embodiment of the present invention.

Furthermore, in yet still another alternative embodiment, the illustration and descriptions of the FIGS. 2A, 2B, and 3 also show a method for post cleaving inspection of the quality of the cleaved film. FIG. 7 is a simplified diagram of a surface with a fully cleaved film but having a partial film breakage found during post cleaving inspection using the apparatus according to an embodiment of the present invention. This diagram is merely an example, which should not unduly limit the scope of the claims herein. One of ordinary skill in the art would recognize many variations, alternatives, and modifications. As shown, a film of material 710 has been cleaved from a tile substrate 700. It may be still set over the remaining tile substrate so that a sensing device can take a raster of multiple surface line scans to obtain a 2D surface profile as described earlier. In particular, the film 700 is shown to contain a partial film breakage near a corner region 760. Many factors may cause this kind of cleaving failure, for example, cleave front branching mention earlier, crystal structure defect, or edge defects causing starting cracks along the film edge. The system and the method for cleaving film of material according to embodiments of the present invention provides an immediate inspection of the film just cleaved, providing many benefits in integrating this system into a complete system performing high volume processing of controlled layer transfers of a plurality of films out of a plurality of tiles. In this example, the resulting map would show, a constant temperature set point, a clearly higher level of laser intensity within area 760 which would denote a missing film region. This occurs because the laser spot is impinging on a region of bulk tile material within region 760 instead of an easier to heat detached film 710. A constant laser intensity throughout the film area would denote a good film.

Figure 8:
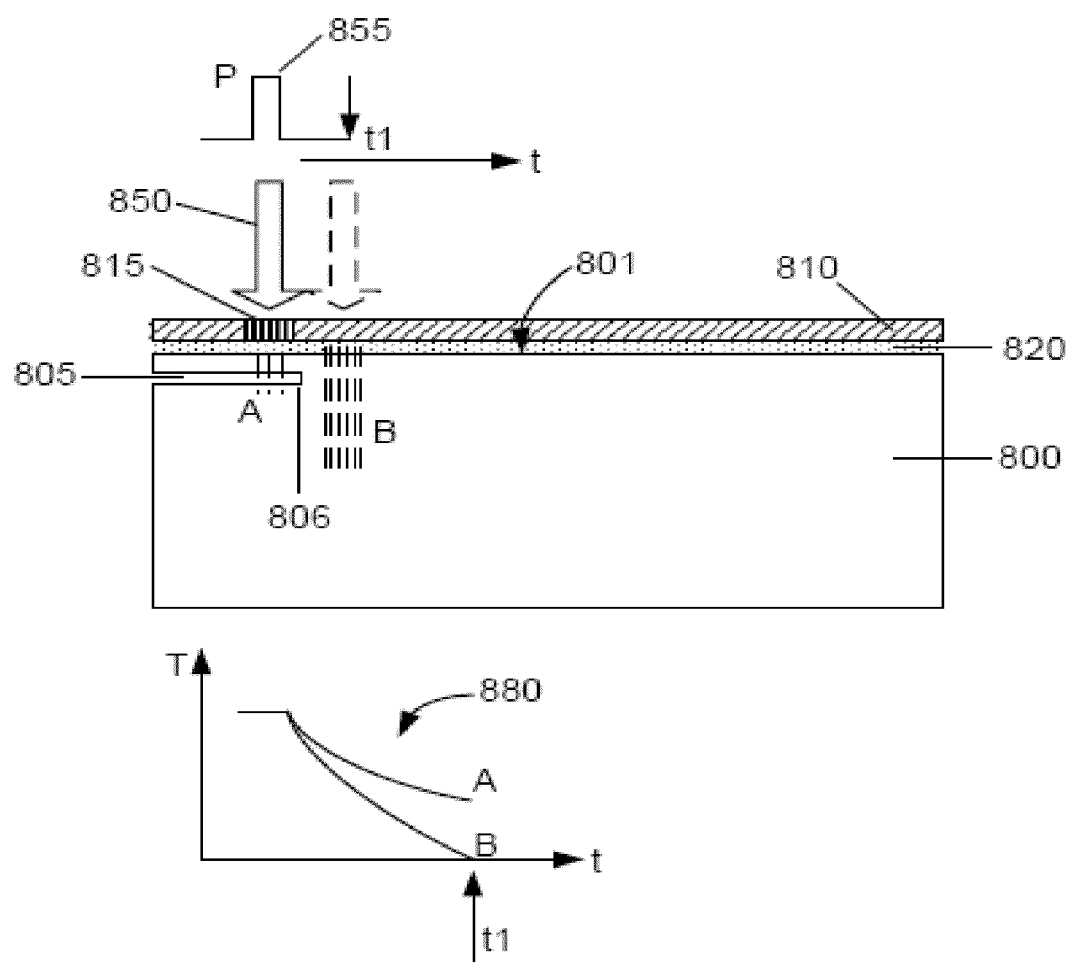
FIG. 8 is a simplified diagram illustrating a method of transferring a film utilizing thermal flux regime for energy controlled cleaving according to an alternative embodiment of the present invention.

FIG. 8 is a simplified diagram illustrating a method of transferring a film utilizing thermal flux regime for energy controlled cleaving according to an alternative embodiment of the present invention. This diagram is merely an example, which should not unduly limit the scope of the claims herein. One of ordinary skill in the art would recognize many variations, alternatives, and modifications. As shown, a substrate tile 800 with a surface 801 is provided to directly couple with an overlayer 810. The overlayer 810 can be made of thermally conductive material susceptible to an external beam of thermal flux 850. For example, the substrate tile 800 is a crystal silicon ingot and the overlayer 810 can be a thin layer of anodized aluminum. The coupling between the overlayer 810 and the substrate tile 800 can be achieved via a layer of liquid medium 820 placed between a bottom face of the overlayer 810 and the surface 801. For example, degassed water with a thickness of about 10 μm may be applied.

As the overlayer 810 is subjected to the beam of thermal flux 850, a portion 815 under the beam can be heated and the heat can be conducted quickly both laterally and down to the substrate 800. The heat transferred to the substrate 800 can be utilized to initiate film cracking 805 to form a crack tip 806 and propagate the crack tip 806, according embodiments of the present invention described throughout the specification and referenced via FIGS. 1 to 3 and corresponding detail descriptions. In a specific embodiment, the crack tip 806 can be identified by monitoring a thermal profile variation across the crack tip, under the structural configuration shown in FIG. 8. In particular, after applying the beam of thermal flux 850 for a period of time (designated by the intensity/time profile of the thermal flux pulse 855), it can be turned off and a thermal profile 880 across the substrate 800 can be measured. As shown, a surface temperature T is measured at a time t1 after the thermal flux is turned off. The surface temperature reflects the thermal conduction profile through the overlayer 810 and the substrate 800. If the beam of thermal flux 850 is irradiated over an area projecting above a film portion (where a crack 805 has formed underneath), heat conduction to the lower portion of the substrate is suppressed relative to a non-cleaved area. Correspondingly, denoted as scenario A, the surface temperature T drops more slowly due to reduced thermal conduction pathway by the crack 805. If the beam of thermal flux 850 hits an area over a bulk (or uncracked) portion instead, there is little reduction in vertical thermal conduction. Therefore, scenario B shows a faster cooling curve in the thermal profile 880. Thus, the thermal conduction change across the cleave front can be used to identify the location of the cleave front 806 and this can be performed quickly via a raster scan over a region of interest or over the whole substrate. Once the cleave front 806 is identified, a scanning path of the beam of thermal flux 850 can be determined and subsequently the cleave front can be propagated by scanning the beam of thermal flux while maintaining a predetermined power level sufficient to induce film cracking Other effects have been found to be important. For example, for single-crystal silicon, a correlation of cleave region thermal conductivity to implant dose has been experimentally determined, allowing the 2D mapping technique described above to be used to measure implant dose uniformity of the bulk tile at a post-implant, pre-cleaving stage.

Although the above has been described using a selected examples to show the operations of the system for cleaving film of material utilizing thermal flux, any combination of any elements of the system, any elements of process steps described as well as others may be used. Additionally, certain elements, materials, processes may be combined and/or eliminated or replaced by others depending upon the embodiment.

Therefore, it is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for cleaving a film of material utilizing thermal flux, the method comprising;
   providing a substrate having a face and an underlying cleave region including an initiation region;
   subjecting the initiation region to a first thermal flux to form a cleave front separating the cleave region of the substrate to a film portion and a bulk portion;
   subjecting an area of the bulk portion substantially in the vicinity of the cleave front to a second thermal flux to cause a temperature difference above and below the cleave region for inducing a propagation of the cleave front expanding the film portion to the area at the expense of the bulk portion;
   determining a scan path for the second thermal flux based on the cleave front; and
   scanning the second thermal flux to follow the scan path to further propagate the cleave front.

2. The method of claim 1 wherein providing a substrate comprises using ion implanting with a pre-selected dose and thermal treatment to form the cleave region at a desired depth beneath the face.

3. The method of claim 1 wherein providing a substrate further comprising forming the initiation region subjected to ion implanting with a dose higher than that for the cleave region.

4. The method of claim 1 wherein the substrate is a silicon ingot having a surface substantially in a crystallographic plane selected from a {100}, {111}, and {110} plane.

5. The method of claim 1 wherein subjecting the initiation region to a first thermal flux to form a cleave front comprises irradiating the first thermal flux to heat the initiation region to a predetermined temperature ranging from 400 to 500° C. for a time period of about 10 seconds or less.

6. The method of claim 1 wherein either the first thermal flux or the second thermal flux is delivered through a beam of electromagnetic radiation including a laser light beam.

7. The method of claim 6 wherein the laser light beam is a fiber laser with a beam diameter of about 3 mm generated from a beam intensity modulated laser diode with modulation frequency 1 to 100 KHz.

8. The method of claim 1 wherein subjecting an area of the bulk portion substantially in the vicinity of the cleave front to a second thermal flux comprises irradiating the second thermal flux under a control scheme at the area of the bulk portion substantially in the vicinity of the cleave front identified by a two-dimensional mapping of infrared heat emission of the face.

9. The method of claim 8 wherein the control scheme comprises a mechanism for determining a process end point at which a beam intensity of the second thermal flux needs to be adjusted and a beam spot of the second thermal flux needs to be scanned.

10. The method of claim 9 wherein the mechanism comprises a feedback control loop based on a constant preset temperature value.

11. The method of claim 9 wherein the mechanism comprises a feedback control loop based on a constant beam intensity value.

12. The method of claim 8 wherein the two-dimensional mapping of infrared heat emission of the face comprises a surface profile of temperature measured in substantially real time by an infrared pyrometer characterized by a response frequency ranging from about 1 KHz to about 150 KHz.

13. The method of claim 8 wherein the two-dimensional mapping of infrared heat emission of the face comprises a surface profile of thermal conductivity for determining any missing portion and undesired cracking in the cleaved film portion and/or in the un-cleaved bulk portion.

14. A method for cleaving a film of material by utilizing thermal flux, the method comprising:
   identifying an initiation region of a cleave region formed at a thickness beneath a surface of a substrate;
   irradiating a beam of thermal flux at the initiation region to form a cleave front separating a film portion having the thickness and a bulk portion of the substrate;
   performing a two-dimensional temperature mapping of the surface to determine a pathway over the bulk portion substantially in the vicinity of the cleave front;
   scanning the beam of thermal flux to follow the pathway to irradiate at the bulk portion substantially in the vicinity of the cleave front to induce a propagation of the cleave front; and
   adjusting the beam of thermal flux along the pathway based on the propagation of the cleave front.

15. The method of claim 14 wherein the substrate comprises material of silicon.

16. The method of claim 14 wherein identifying an initiation region of a cleave region comprises determining a region subjected to ion implantation with a dose of proton about $6 \times 10^{16}$ cm$^{-2}$ or greater and an applied thermal budget effectively characterized by a temperature of 650° C. or higher for 1 second or longer.

17. The method of claim 14 wherein irradiating a beam of thermal flux at the initiation region comprises supplying thermal energy to raise temperature therein to about 400° C. to 600° C. within 1 to 2 seconds.

18. The method of claim 17 wherein the beam of thermal flux comprises an energy pulse delivered by a beam of electromagnetic radiation including a laser light beam.

19. The method of claim 14 wherein performing a two-dimensional temperature mapping of the substrate comprises using an infrared pyrometer to measure heat emission from the surface during scanning across the substrate with a response frequency of at least 1 KHz, then converting to a two-dimensional image.

20. The method of claim 14 wherein adjusting the beam of thermal flux along the pathway comprises performing an amplitude modulation of the beam of thermal flux to maintain a predetermined temperature sufficient for propagating the cleave front within a selected time period.

21. The method of claim 14 wherein adjusting the beam of thermal flux further comprises keeping the beam of thermal flux at a predetermined power level during the scanning until a temperature rise is sensed due to the propagation of the cleave front, then turning off the beam of thermal flux.

22. The method of claim 14 further comprises inspecting the substrate based on a two-dimensional image during and after a film of material being partially or completely cleaved from the substrate to determine a quality of the film of material.

23. A system for cleaving a film of material from a bulk substrate, the system comprising:
   a stage member configured to fix a bulk substrate having a surface and a pre-formed cleave region including an initiation region;
   an energy source comprising a head member and a modulator, configured to provide a beam of thermal flux capable of scanning over the surface and at least inducing a film cracking with a cleave front formed within the initiation region and a propagation of the cleave front along the cleave region;
   a sensor device configured to measure temperature throughout the surface;
   a controller coupled to the sensor device and the modulator to adjust the beam of thermal flux; and
   a host computer in communication with the energy source and the controller,
      to cause the controller to generate one or more feedback control signals based on a two-dimensional profile of temperature measured by the sensor device referenced to a preset temperature value;
      to cause, using the one or more feedback control signals, the modulator to adjust intensity of the beam of thermal flux to maintain a temperature of the cleave front irradiated by the beam of thermal flux at a predetermined value to control the propagation of the cleave front; and
      to cause, using the one or more feedback control signals, the head member to scan the beam of thermal flux over the surface to synchronize the propagation of the cleave front.

24. The system of claim 23 wherein the bulk substrate comprises a silicon ingot or tile.

25. The system of claim 23 further comprising an enclosure to enclose at least the stage member and the bulk substrate.

26. The system of claim 23 wherein the enclosure can be made into a vacuum environment.

27. The system of claim 23 wherein the energy source comprises a laser generator including an amplitude modulated laser diode.

28. The system of claim 27 wherein the beam of thermal flux comprises a beam of pulse laser light with an adjustable intensity and pulse length for irradiation under a control scheme with a response frequency of at least 1 KHz.

29. The system of claim 23 wherein the sensor device is an IR pyrometer characterized by a response frequency ranging from about 1 KHz to 150 KHz.

30. A method for cleaving a film of material via energy control, the method comprising:
   providing a substrate having a face and an underlying crack initiation region;
   coupling a thermally conductive overlayer on the face;
   subjecting the thermally conductive overlayer to a first thermal flux projecting over the crack initiation region to induce a cracking at the crack initiation region, forming a cleave front between a cleaved film portion and an uncracked bulk portion;

monitoring a temperature profile of the thermally conductive overlayer to determine a location of the cleave front; and subjecting an area of the thermally conductive overlayer projecting the vicinity of the cleave front to a second thermal flux to induce a propagation of the cleave front, expanding the film portion to the area at the expense of the bulk portion.

* * * * *